July 18, 1967
E. J. GRIMMER ETAL
3,331,910
CONDENSER BUSHING HAVING LONGITUDINALLY EXTENDING DUCTS
THERETHROUGH FOR THE FLOW OF OIL TO REMOVE
HEAT RESULTING FROM DIELECTRIC LOSSES
Filed Oct. 4, 1965
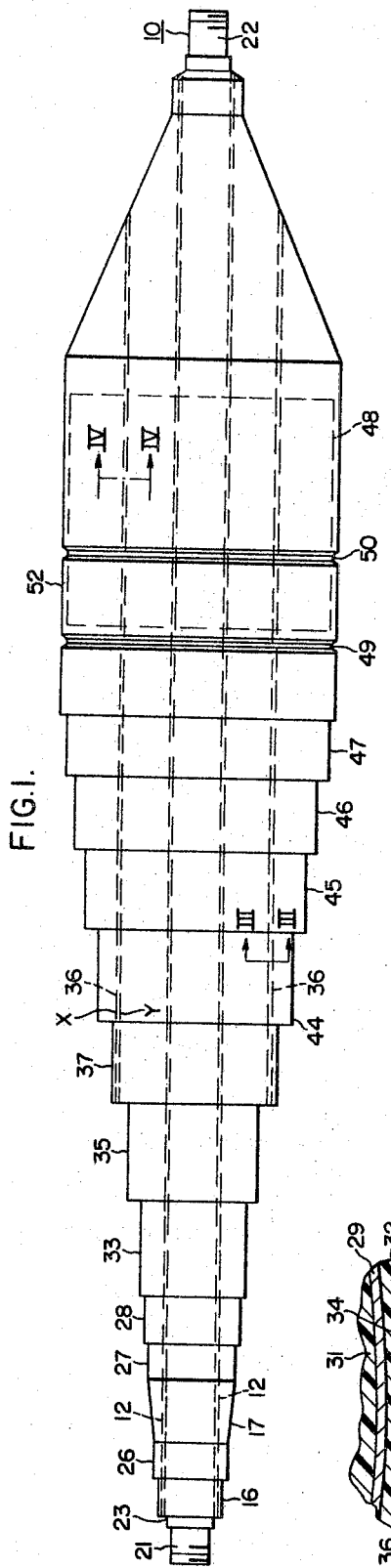
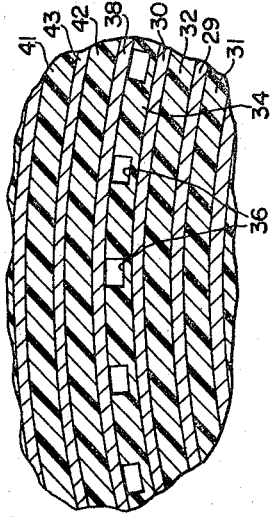
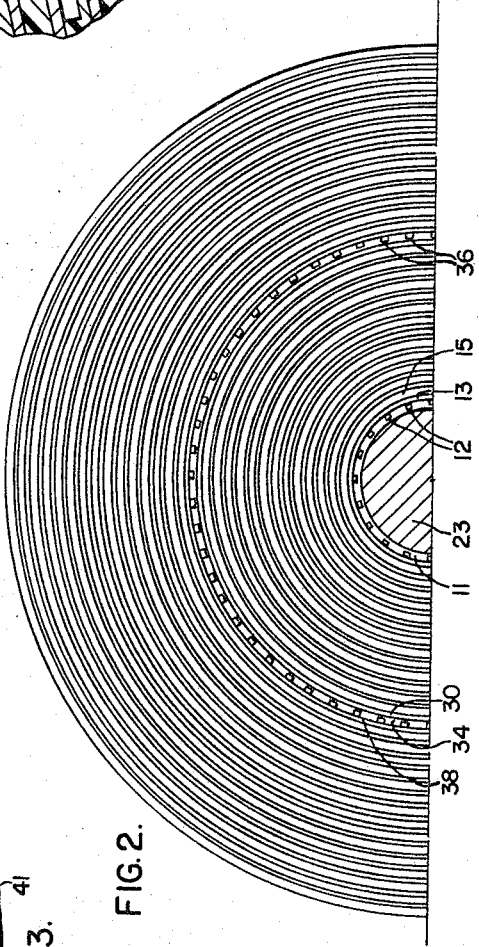
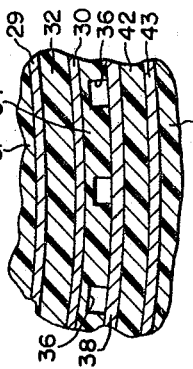
INVENTORS
Elmer J. Grimmer
& Edmond C. Wentz
BY *Maury I. Hull*
ATTORNEY United States Patent Office 3,331,910
Patented July 18, 1967

3,331,910
CONDENSER BUSHING HAVING LONGITUDINALLY EXTENDING DUCTS THERETHROUGH FOR THE FLOW OF OIL TO REMOVE HEAT RESULTING FROM DIELECTRIC LOSSES
Elmer J. Grimmer and Edward C. Wentz, Sharpsville, Pa., assignors to Westinghouse Electric Corporation, Pittsburgh, Pa., a corporation of Pennsylvania
Filed Oct. 4, 1965, Ser. No. 492,788
2 Claims. (Cl. 174—15)

This invention relates to improvements in bushings, and more particularly to an improved condenser bushing.

In lead-in bushings for very high voltage transformers, circuit breakers, or other apparatus, the dielectric loss in the insulation over the high voltage conductor is high enough to cause thermal instability in the insulation with resulting possible failure of the installation under unfavorable conditions of high operating temperature.

In order to prevent this possible insulation failure it is necessary to provide means for carrying away, out of the massive body of insulation, the heat representing dielectric losses.

In summary, according to our invention ventilating ducts or grooves are provided longitudinally to provide for the flow of oil to carry away the heat from the insulating mass. In a preferred embodiment of our invention we provide a number of circumferentially spaced longitudinally extending ventilating grooves in the layer of dielectric immediately adjacent the conductor stud, and we further provide a plurality of circumferentially spaced ventilating grooves extending longitudinally through the body of insulation in a layer of dielectric approximately half way along the radius of the bushing. Each grooved section of insulating material is covered with a layer of foil which is electrically connected to the layer of foil or stud just under the grooved section, and the rest of the main body of insulation is constructed in a conventional manner. These ventilating grooves permit oil to flow through the main body of insulation to carry away the heat, and still by the provision of the electrically connected foil layers under and over the grooves, keeps the oil from being electrically stressed beyond its capability.

Accordingly, a primary object of our invention is to provide a new and improved bushing.

Another object is to provide a new and improved condenser bushing.

An additional object is to provide a new and improved condenser bushing having ventilating grooves for the flow of oil to conduct away the heat caused by dielectric losses.

A further object is to provide a new and improved condenser bushing having at least one dielectric layer with longitudinally extending grooves passing therethrough for the flow of oil to carry away the I²R losses in the conductor stud.

These and other objects will become more clearly apparent after a study of the specification, when read in connection with the accompanying drawings, in which:

FIGURE 1 is a side elevational view of our grooved condenser bushing according to the preferred embodiment thereof;

FIG. 2 is a composite view at one end of the conductor stud, showing features which would appear in elevation and in section, to assist in illustrating the invention;

FIG. 3 is an enlarged sectional view through the lines 3—3 of FIG. 1; and

FIG. 4 is an enlarged sectional view through the lines 4—4 of FIG. 1.

Referring now to the drawings for a more detailed understanding of the invention in which like reference characters are used throughout to designate like parts, and in particular to FIG. 1 and FIG. 2, a conductor stud generally designated 10 having threaded ends 21 and 22 of reduced diameter and a main body portion of increased diameter 23 extends through the bushing and has a layer of insulation 11 extending over most of the length of the conductor stud, the material of the layer of insulating material 11 being if desired a resin bonded paper or other suitable insulating material. The paper may be wrapped to a thickness of, for example, ⁵⁄₁₆ in. In this insulation 11 a number of longitudinally extending grooves 12 are formed by, for example, cutting ⅛ inch wide grooves along the entire length of the insulation to form ducts through which cooling oil can flow. A layer of metal foil 13 is applied over this insulation and connected to the center conductor stud electrically at a convenient point inside the bushing to avoid a point of high electrical stress, thereby providing a smooth metal surface for the main insulation body to be wound on.

The thickness of the insulating layer 11 is not critical, nor is the width of the grooves 12. The insulating layer 11 should be sufficiently thick so that the grooves 12 are not cut, or do not extend, all the way through to the conductor stud underneath.

Approximately half the main portion of the insulating body is then applied over the layer of foil 13, consisting of alternate layers of insulating and conductive material in a manner to provide substantially uniform capacity between any two adjacent conductive layers. As will be readily understood, and as is conventional in the art, this entails that as the conductive layers become larger in diameter they may become shorter in order to maintain the uniform capacity between adjacent conductive layers. This is apparent from an examination of FIG. 1.

For simplicity of illustration, in FIGS. 2, 3 and 4 the dielectric layers of the bushing are shown as of substantially uniform thickness. In actual practice, the dielectric layers might be 80 mils thick near the conductor stud, increasing gradually to a thickness of about 160 mils near the radial half way area of the bushing, and thereafter decreasing gradually to a thickness of 80 mils at the outermost layers.

The capacity of each layer is calculated independently and individually to insure uniform capacity between layers of conductive material., For simplicity of illustration the layers of insulation having grooves therein are shown as of substantially the same width as the layers of insulating material not having grooves therein; in actual practice, the layers of insulation to have grooves cut therein are made considerably thicker than the others.

In actual practice, the layers of insulating material not having grooves therein may be untreated insulating kraft paper with spots of shellac on one side to make the paper adhere and give greater mechanical strength. The paper impregnates easily with the oil. The layers of insulating material which are going to have grooves machined therein are wound with thinner kraft paper with a full coating of shellac on one side.

It will be understood that the layers of conductive material do not extend all the way to the ends of the layers of insulating material disposed around their outside surfaces.

After approximately half the main body of insulation and foil is applied including the layer of foil 30, another section of insulation 34 approximately 3/16 in. thick is wound over this layer of foil 30 and ventilating grooves 36 are cut longitudinally to carry oil to carry away the heat in the center of the insulating mass. This latter group of ventilating grooves are shown clearly at 36 in FIG. 2. Layer of foil 38, FIGS. 2 and 3 is wound over the grooved insulating layer 34 and is electrically connected to foil layer 30 by connections inside the bushing.

The remainder of the bushing body, consisting of alternate layers of insulating and conductive material is then applied. The outermost layer 52 is of insulating material, and has groove 50 therein to permit electrical connection to conductive layer 48 underneath. Groove 49 may be used if desired to make an electrical tap to a conductive layer underneath layer 48.

FIG. 2 is a composite view to show features of the apparatus; one looking at the bushing from the end would see only grooves and stepped layers of insulating material.

In FIG. 1 oppositely disposed longitudinally extending grooves 12 are shown in dashed lines as passing through the layer of insulating material 11. Oppositely disposed longitudinally extending grooves 36 in layer 34 are also shown in dashed line.

As previously stated, the electrical connection between foil layers 30 and 38 is not made at the adjacent ends of the conductive material, but is made nearer the axial center of the layers. This is done to avoid creating an area of unusual voltage stress. If desired, insulating layer 34 may have a groove cut therein similar to one of the grooves 49 or 50 for the purpose of making electrical connection, or a spot may be cut through the layer of insulating material, and an electrical lead, soldered at each end to foil layers 30 and 38, extend through the hole, not shown. If a groove is cut in layer 34 it need not extend all the way around the layer.

As previously stated, over the layer of foil 13 in FIG. 2 there is disposed a layer of insulating material 15. The stepped insulating layers of progressively increasing diameter 16, 26, 27, 28, 33, 35, 37, 44, 45, 46, 47, and 52, FIG. 1, may each comprise or include a large number of alternate foil and insulating layers.

It is noted in FIG. 1 that a surface or portion 17 of the bushing tapers. This is done for the particular application for which the illustrative bushing is to be used, and is done to get clearance so that the condenser bushing will fit in a porcelain weather casing.

Whereas all layers of conductive material are foil, other suitable conductive material could be employed.

Particular reference is now made to FIG. 3, a section through the lines 3—3 of FIG. 1. Conductive layer 29 is shown together with the insulating layer 31 beneath. The insulating layer between conductive layers 29 and 30 is shown at 32. Over the layer of foil 30 is disposed another section of insulating material 34, for example 3/16 in. thick, and ventilating grooves 36 extending longitudinally are cut in the layer of insulating material 34. An additional layer of conductive material or foil 38 is then disposed around the grooved layer of insulating material and as aforementioned electrically connected to conductive layer 30 by a connection inside the bushing. Conductive layers 30 and 38 may end at points Y and X, FIG. 1. In FIG. 3 one also sees the insulating layer 42 underneath conductive layer 43, and insulating layer 41.

Particular reference is made now to FIG. 4, and enlarged section through the lines 4—4 of FIG. 1. FIG. 4, in addition to showing some of the conducting and insulating layers visible in FIG. 2, also shows ducts 36 through the layer of insulating material 34 between the conductive layer 38 and the conductive layer 30.

There has been provided then a bushing well suited to accomplish the aforedescribed objects of the invention. The longitudinally extending grooves 12 near the conductor stud provide ventilating grooves through which oil may flow to conduct the heat generated in the bushing resulting from dielectric losses away from the bushing, as well as conduct away heat generated by $I^2R$ losses in the conductor stud 10. The additional longitudinally extending grooves 36 extending through the insulating body of the bushing also provide ventilating grooves which permit oil to flow through the main body of insulation to carry away the heat. As previously stated, by the provision of electrically connected foil layers under and over the grooves or ducts 12 and 36, the oil is prevented from being electrically stressed beyond its capability.

As further stated, in accordance with conventional practice the capacity between successive layers of conductive material is maintained substantially equal, to provide the desired voltage distribution and to make maximum use of the dielectric capabilities of the bushing.

As previously stated, FIG. 2 is a composite view. One looking at the bushing from the left end, FIG. 1, would see only the insulating steps of the outer covering of the bushing; additional lines are shown in FIG. 2 to indicate that each step may include many alternate layers of foil and insulation.

Threaded portions of the conductor stud need not be of reduced diameter.

Stud 10 may be a tube if desired.

$I^2R$ losses in conductor stud 10 are transferred to the oil flowing in grooves or ducts 12 and do not result in heating the insulation of the bushing.

Whereas we have shown two sets of ducts, more than two could be employed if desired.

Whereas, we have referred to 12 and 36 as grooves cut in the insulating layers, they could be ducts provided in any convenient manner.

In the claims, "dielectric material" and "insulating material" are used substantially synonymously.

Whereas certain dimensions have been given for illustrative purposes, the invention is not limited thereby.

Whereas we have shown and described our bushing with respect to an embodiment thereof which gives satisfactory results, it should be understood that changes may be made and equivalents substituted without departing from the spirit and scope of the invention.

We claim as our invention:

1. A condenser bushing comprising, in combination, a conductor stud, a layer of insulating material disposed adjacent the stud, said layer of insulating material being composed of a plurality of layers of paper having a coat of resin on one side thereof to bond the layers of paper into a firm layer of insulation, said layer of insulating material having a plurality of circumferentially spaced longitudinally extending ducts extending the entire length thereof for the flow of oil to conduct heat generated in the dielectric of the bushing away from the bushing, a layer of conductive material around said layer of insulating material having the ducts therein, said layer of conductive material being electrically connected to the conductor stud, a plurality of alternate layers of other insulating material and layers of conductive material disposed around said first-named layer of conductive material and forming some of the capacity steps of a condenser bushing, the other insulating material being oil impregnated paper, an additional layer of said first-named insulating material having a plurality of longitudinally extending ducts therein at spaced circumferential intervals for ventilating the bushing, the next outermost layer of conductive material being connected electrically to the next innermost layer of conductive material so that no electrical stress is applied to the last-named layer of insulating material having ducts therein, the additional layer of the first-named insulating material being disposed substantially at the radial center of the bushing, and further alternate layers of the other insulating material and conductive material with means for making an electrical connection to the outermost layer of conductive material, the capacity between any two adjacent electrically disconnected layers of conductive material being substantially the same throughout the bushing.

2. A bushing according to claim 1 further characterized as having the layers of insulating material increasing in thickness from the stud to substantially the radial center of the bushing and thereafter decreasing in thickness toward the outermost layer of insulating material of the bushing.

References Cited

UNITED STATES PATENTS

| | | | |
|---|---|---|---|
| 463,107 | 11/1891 | Degenhardt | 174—27 |
| 1,511,935 | 10/1924 | Bayles et al. | |
| 1,819,860 | 8/1931 | Belfils | 310—65 X |

FOREIGN PATENTS

| | | |
|---|---|---|
| 1,122,364 | 5/1956 | France. |
| 199,118 | 6/1923 | Great Britain. |
| 345,604 | 3/1931 | Great Britain. |
| 887,029 | 1/1962 | Great Britain. |

OTHER REFERENCES

Grimmer et al., German printed application No. 1,085,579, published July 21, 1960.

LARAMIE E. ASKIN, *Primary Examiner.*